United States Patent [19]

Kosaka

[11] Patent Number: 6,119,142
[45] Date of Patent: *Sep. 12, 2000

[54] DATA COMMUNICATION APPARATUS FOR MANAGING INFORMATION INDICATING THAT DATA HAS REACHED ITS DESTINATION

[75] Inventor: Masahiko Kosaka, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/637,306

[22] Filed: Apr. 24, 1996

[30] Foreign Application Priority Data

Apr. 25, 1995 [JP] Japan ..................................... 7-099313

[51] Int. Cl.⁷ ...................................................... G06F 15/16
[52] U.S. Cl. .......................... 709/200; 709/203; 709/213; 709/218; 709/250; 358/400; 358/468; 370/338
[58] Field of Search .......................... 395/200.01, 200.02, 395/200.08, 200.2, 825–828, 200.3, 200.33, 200.43, 200.47–200.48, 200.74, 200.8; 358/400, 468, 442; 370/400–402, 338, 252; 709/200, 203, 213, 217–218, 244, 250

[56] References Cited

U.S. PATENT DOCUMENTS

| | | | |
|---|---|---|---|
| 5,046,189 | 9/1991 | Kainuma | 379/100.03 |
| 5,101,427 | 3/1992 | Kotani et al. | 379/100.14 |
| 5,235,433 | 8/1993 | Clarkson et al. | 358/434 |
| 5,283,665 | 2/1994 | Ogata et al. | 358/434 |
| 5,552,901 | 9/1996 | Kikuchi et al. | 358/468 |
| 5,602,993 | 2/1997 | Stromberg | 707/511 |
| 5,870,385 | 2/1999 | Ahmadi et al. | 370/252 |

FOREIGN PATENT DOCUMENTS 0372877  6/1990  European Pat. Off. ......... H04N 1/21

OTHER PUBLICATIONS

Research Disclosure, No. 332, Dec. 1, 1991, Emsworth, GB, p. 920, "Method For Facsimile Distribution On A Local Area Network".

Primary Examiner—Zarni Maung
Assistant Examiner—Bharat Barot
Attorney, Agent, or Firm—Fitzpatrick, Cella, Harper & Scinto

[57] ABSTRACT

Upon transmission of document data in accordance with a transmission instruction from a client on a LAN, parameters such as a document identifier and an identifier of a receiver terminal are transmitted to a receiving-side communication apparatus. Transmission result (whether or not communication between the apparatus on both sides has been normally performed, whether or not the receiver terminal has been notified of the incoming call, whether or not the document data has been transferred to the receiver terminal, and the status of the terminal) sent from the receiving-side communication apparatus is managed in correspondence with the document identifier. Further, the transmission result is notified to the client that made the transmission instruction. The transmission-management information on plural transmission cases is print-outputted in a report format.

27 Claims, 8 Drawing Sheets

FIG. 6

| F1 DOCUMENT IDENTIFIER | F2 TRANSMISSION-START DATE & TIME | F3 RECEIVING-SIDE TELEPHONE NUMBER | F4 RECEIVER-TERMINAL IDENTIFIER | F5 DOCUMENT ATTRIBUTE | F6 COMMUNICATION RESULT | F7 TRANSFER RESULT | F8 SENDER-TERMINAL IDENTIFIER |
|---|---|---|---|---|---|---|---|
| 1203 | 04/15 23:03 | 03 3758 2111 | MURAYAMA | FACSIMILE DOCUMENT P.10 | OK | OK/OK | KOSAKA |
| 1204 | 04/15 23:10 | 044 588 1507 | SUZUKI | FACSIMILE DOCUMENT P.2 | OK | OK/NG(#016) | ENDOH |

DATA COMMUNICATION APPARATUS FOR MANAGING INFORMATION INDICATING THAT DATA HAS REACHED ITS DESTINATION

BACKGROUND OF THE INVENTION

This invention relates to a data communication apparatus and method for data transmission/reception.

Conventionally, in apparatuses of this type, e.g., facsimile apparatuses, information can be obtained only from a transmitting side, i.e., a telephone number of a receiving-side facsimile apparatus, transmission start time, the result of the transmission etc. managed as transmission management information. In facsimile apparatuses having a LAN (Local Area Network) interface, a received facsimile document is transferred to a terminal connected to a LAN, based on a predetermined address table or the like.

However, in a conventional facsimile apparatus, when communication between the facsimile apparatuses has been completed, it is impossible to determine whether the facsimile document has been transferred to the terminal connected to the LAN or a user of the terminal which is logged on to the network.

In addition, in a conventional facsimile apparatus, even the receiving side knows the fact that a receiver terminal on the LAN designated by the transmitting side is not present on the LAN, this cannot be informed to the transmitting side. Further, in spite of the fact that the conventional transmission-management information can be independently managed with a document identifier by the transmitting side and the receiving side, the information is not commonly managed by both sides.

SUMMARY OF THE INVENTION

The present invention has been made in consideration of the above situation, and has its object to provide a data communication apparatus and method capable of holding exact and detailed communication management information.

Further, another object of the present invention is to provide a data communication apparatus and method which enables a transmitting side and a receiving side to perform common communication management.

Further, another object of the present invention is to provide a data communication apparatus and method which enables a transmitting side to discriminate the status of transmitted data.

Further, another object of the present invention is to provide a data communication apparatus and method capable of discriminating the status of a designated receiver terminal on a transmitting side.

Further, another object of the present invention is to provide a data communication apparatus and method which can easily perform communication management appropriate to a data communication apparatus connected to a LAN.

Further, another object of the present invention is to provide a data communication apparatus and method which can easily notify a terminal on a transmitting side of a transmission result.

Further, another object of the present invention is to provide a data communication apparatus and method which can easily cope with a communication error and the like.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of a report on communication-management information printed out on the transmitting side;

DETAILED DESCRIPTION OF THE PREFERRED EMBODIMENT

Preferred embodiment of the present invention will now be described in detail in accordance with the accompanying drawings.

Figure 1:
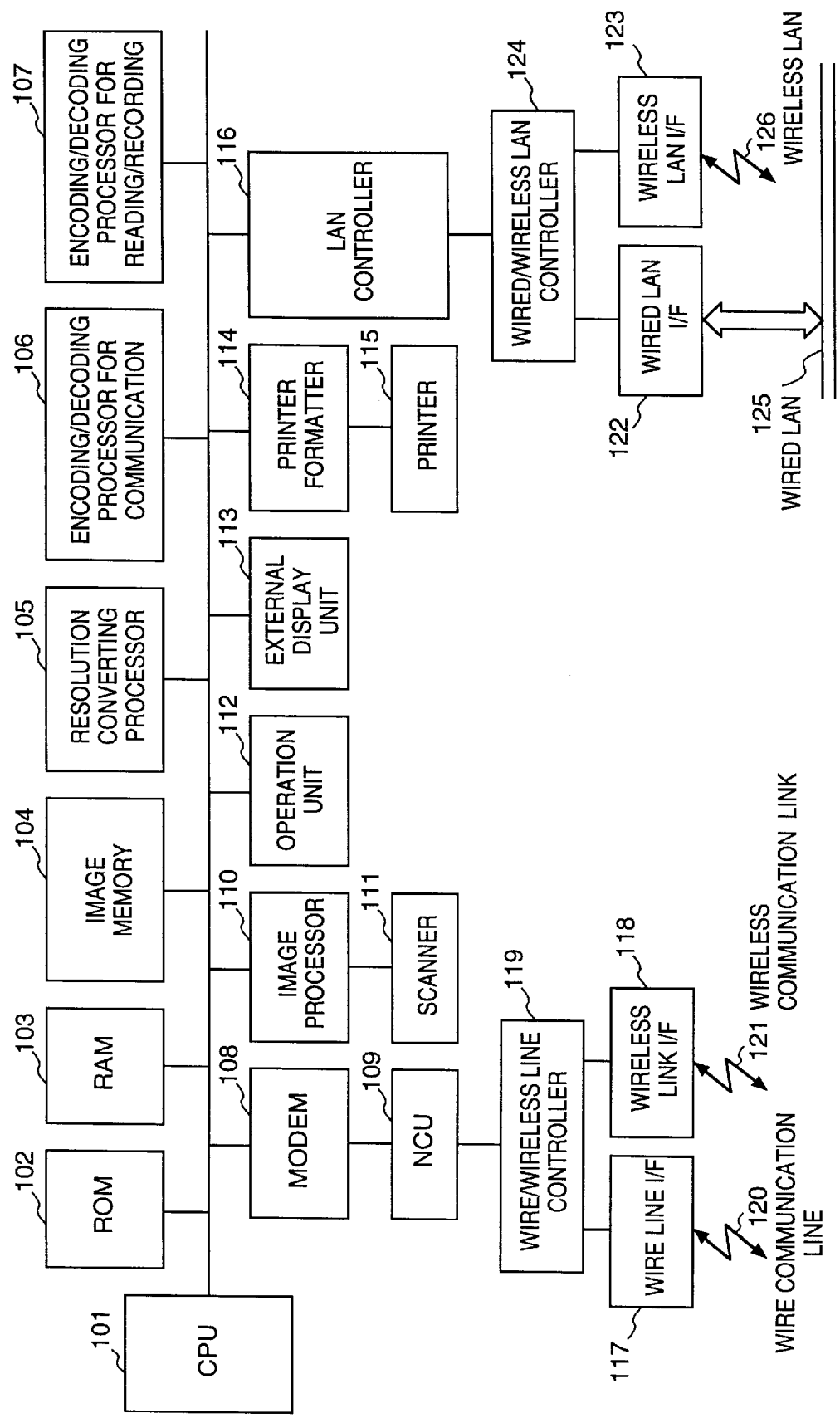
FIG. 1 is a block diagram showing the construction of a facsimile apparatus according to an embodiment of the present invention.

FIG. 1 is a block diagram showing the construction of a facsimile apparatus according to an embodiment of the present invention. In FIG. 1, a CPU 101 is a system controller which controls the overall facsimile apparatus. A ROM 102 is a memory for storing control programs for the CPU 101. A RAM 103 comprises, e.g., a SRAM, for storing program-control variables and the like. The RAM 103 is also used as a buffer RAM which provides a work area for storing various data such as setting values registered by an operator, apparatus management data and the like. An image memory 104 comprises, e.g., a DRAM, for storing image data.

A resolution-conversion processor 105 performs resolution-conversion control such as millimeter to inch conversion of raster data. An encoding/decoding processor (for communication) 106 performs coding for communication when the coding method in reading and recording and that in communication are different. An encoding/decoding processor (for reading/recording) 107 performs coding/decoding of image data in reading and recording. A MODEM 108 performs modulation on a facsimile reception signal.

An NCU (Network Control Unit) 109 transmit a communication-destination selection signal (dial pulses or a multi-frequency tone signal) onto a wire communication line 120 via a wire line I/F (interface) 117, or onto a wireless communication link 121 via a wireless link I/F 118. Further, the NCU 109 performs an automatic incoming-call terminating operation by detection of a call signal from the wire communication line 120 or the wireless communication link 121. Note that a wire/wireless line controller 119 controls the wire line I/F 117 and the wireless link I/F 118.

A scanner 111 comprises, e.g., a contact image sensor, an original feeding mechanism and the like, for optically reading an image on an original and converting the read image into electrical image data. An image processor 110 performs correction on the image data read by the scanner 111 and outputs a high-precision image data. An operation unit 112 comprises a keyboard (not shown) and the like, for the operator's various input operations. An external display unit 113 displays predetermined information with an LCD, LED and the like, for the user.

Upon print out of file data from a workstation or the like, a printer formatter 114 interprets code data such as printer description language, and converts the code data into image data. A printer 115 printouts a received image or file data on a recording sheet. A wired LAN I/F 122 connects the facsimile apparatus to a wired LAN 125, while a wireless LAN I/F 123 connects the facsimile apparatus to a wireless LAN 126. These wired LAN I/F 122 and the wireless LAN I/F 123 are controlled by a wired/wireless LAN controller 124. A LAN controller 116 processes data for data transmission/reception with a server (not shown) or a terminal on the wired LAN 125 or wireless LAN 126.

Figure 2:
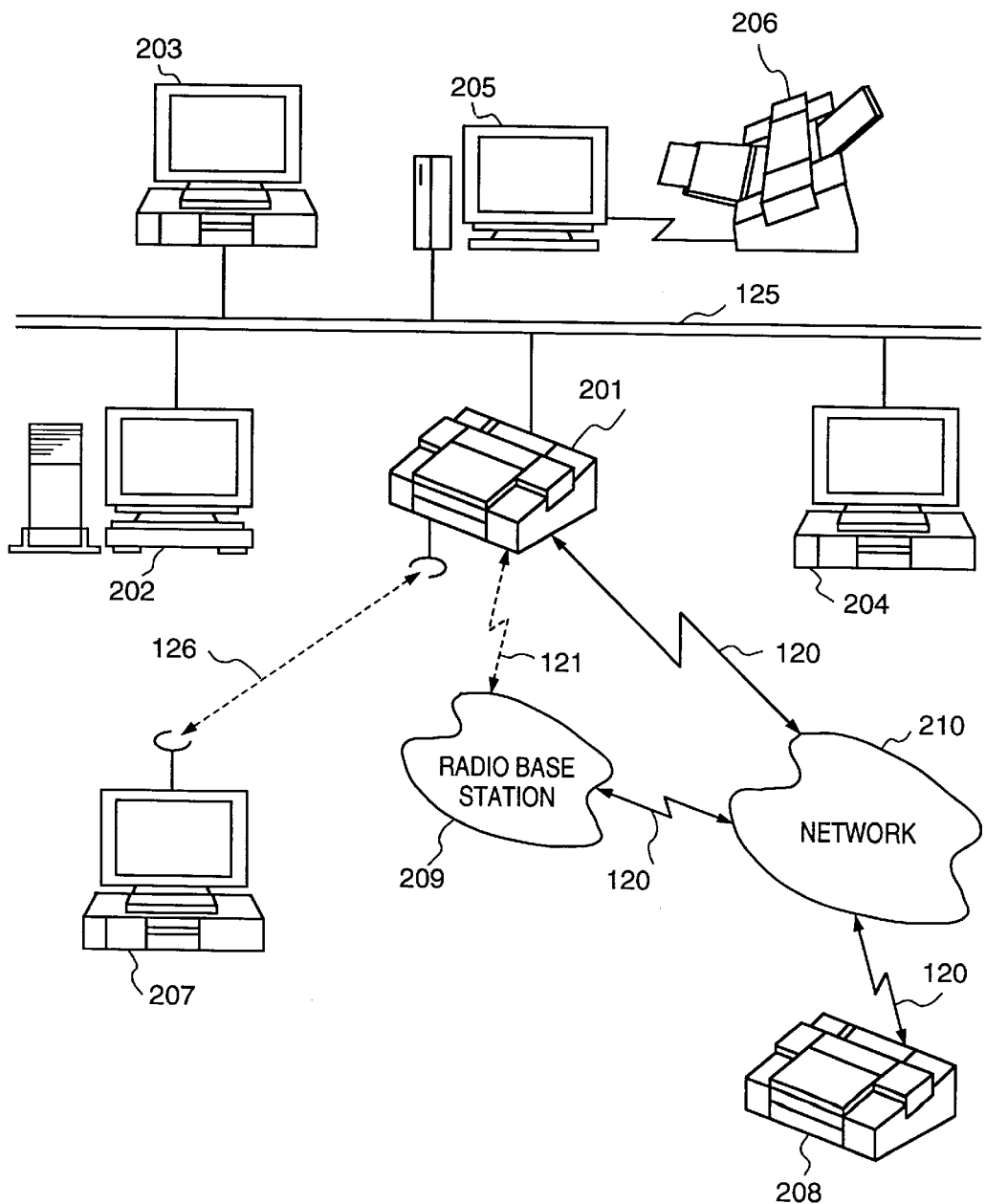
FIG. 2 is a connection diagram of the facsimile apparatus.

FIG. 2 is a connection diagram of a system including the facsimile apparatus of the embodiment shown in FIG. 1. In FIG. 2, reference numeral 201 denotes the facsimile apparatus in FIG. 1 which can be directly connected to the wired LAN 125 and the wireless LAN 126; 202, a server machine for a LAN to which the facsimile apparatus 201 is connected, which manages the LAN and files on the LAN; and 203 and 204, client machines (information processing terminals) connected to the wired LAN 125. An operator, i.e., a client (user of the terminal) can give various instructions to other devices by using the client machine. Further, the operator performs log-on processing by using the client machine to notify the server machine 202 of the presence of the client machine on the LAN.

Numeral 205 denotes a printer server which receives a print requirement from the client machines 203 and 204 and outputs image data to a printer 206. The printer 206 printouts the image data sent from the printer server 205.

Numeral 207 denotes a client machine connected to the wireless LAN 126; 208, a receiving-side facsimile apparatus which performs communication with the facsimile apparatus 201 via a telephone line; and 209, a radio base station. The facsimile apparatus 201 communicates with the facsimile apparatus 208 via the wireless communication link 121.

Numeral 210 denotes a network to which the facsimile apparatus 208 and the radio base station 209 are connected via the wire communication line 120. The wireless LAN 126 is constituted by facsimile apparatuses and client machines that have wireless LAN interfaces. The wireless link 121 connects the facsimile apparatus 201 with the radio base station 209 via wireless link interfaces.

Figure 3:
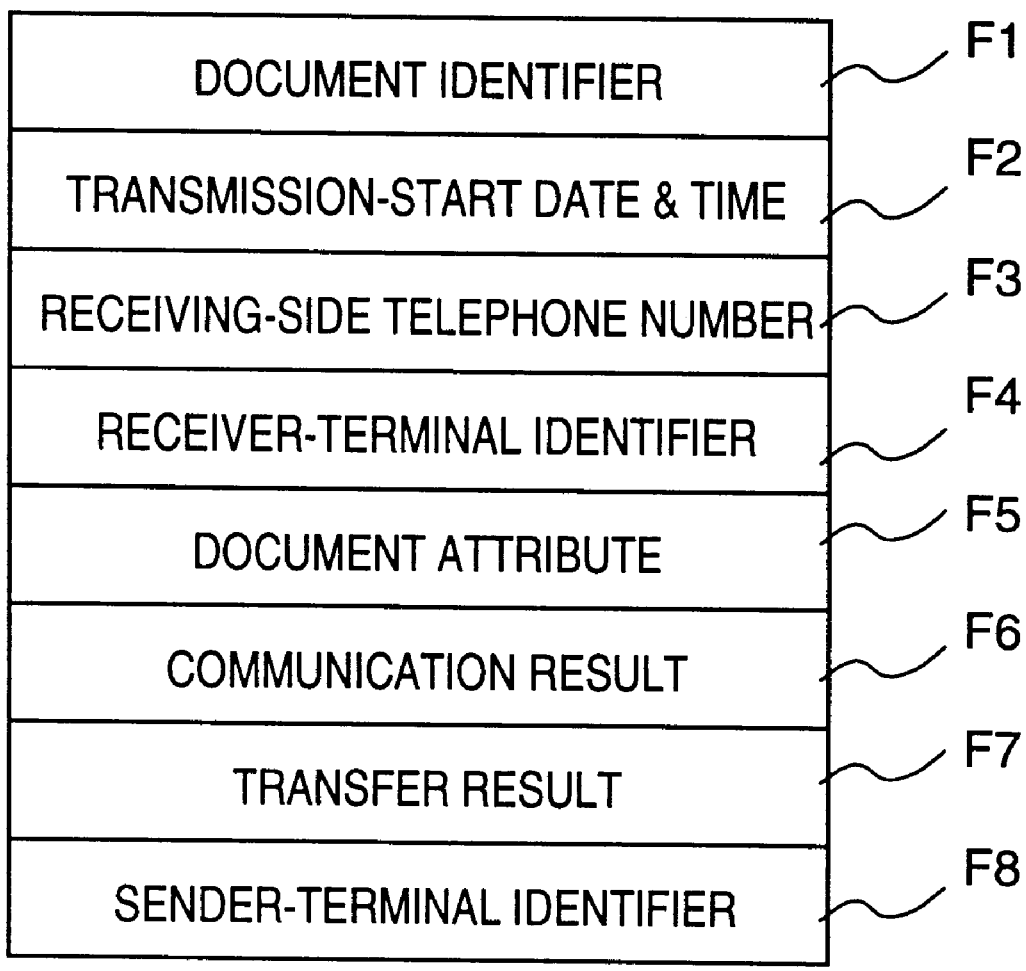
FIG. 3 is a transmission-management information table managed by the facsimile apparatus on a transmitting side.

FIG. 3 illustrates one item of information held by a transmission-information management table managed by the transmitting-side facsimile apparatus of the present embodiment. This information is stored in the RAM 103. In FIG. 3, numeral F1 denotes a document identifier field. When sending a facsimile document, a unique number assigned to each transmission document is issued and after that, a document identifier which is an identifier for all management parameters of transmission-management information, is set in this field.

Numeral F2 denotes a transmission-start date & time field, in which the date and time when the document has actually been transmitted is set. Numeral F3 denotes a receiving-side telephone-number field in which a telephone number of a receiving-side facsimile apparatus is set. Numeral F4 denotes a receiver-terminal identifier field in which a network identifier of a receiver terminal which is managed on the LAN connected to the receiving-side facsimile apparatus, and to which a facsimile document is intended to be transferred, is set as a receiver-terminal identifier. This network identifier is also transmitted to the receiving-side facsimile apparatus.

Numeral F5 denotes a document attribute field in which an attribute of the transmission document, i.e., information on whether the transmission document has been transmitted as a facsimile document data (pixel data) or code data such as printer description language, is set. Further, if the transmission document has been transmitted as the facsimile document data, an attribute of the data indicative of resolution is set; while if the transmission document has been transmitted as code data, the type of the code data is set. Numeral F6 denotes a communication result field in which the result of communication between the transmitting-side facsimile apparatus and the receiving-side facsimile apparatus is set. Numeral F7 denotes a transfer result field in which the result of transfer is set as information about whether or not the transmission document has been normally transferred to the client terminal on the LAN from the receiving-side facsimile apparatus. Numeral F8 denotes a sender-terminal identifier field in which a network identifier of a sender terminal (client) that has made transmission instruction, and is managed on the LAN connected to the transmitting-side facsimile, is set as a sender-terminal identifier.

Figure 4:
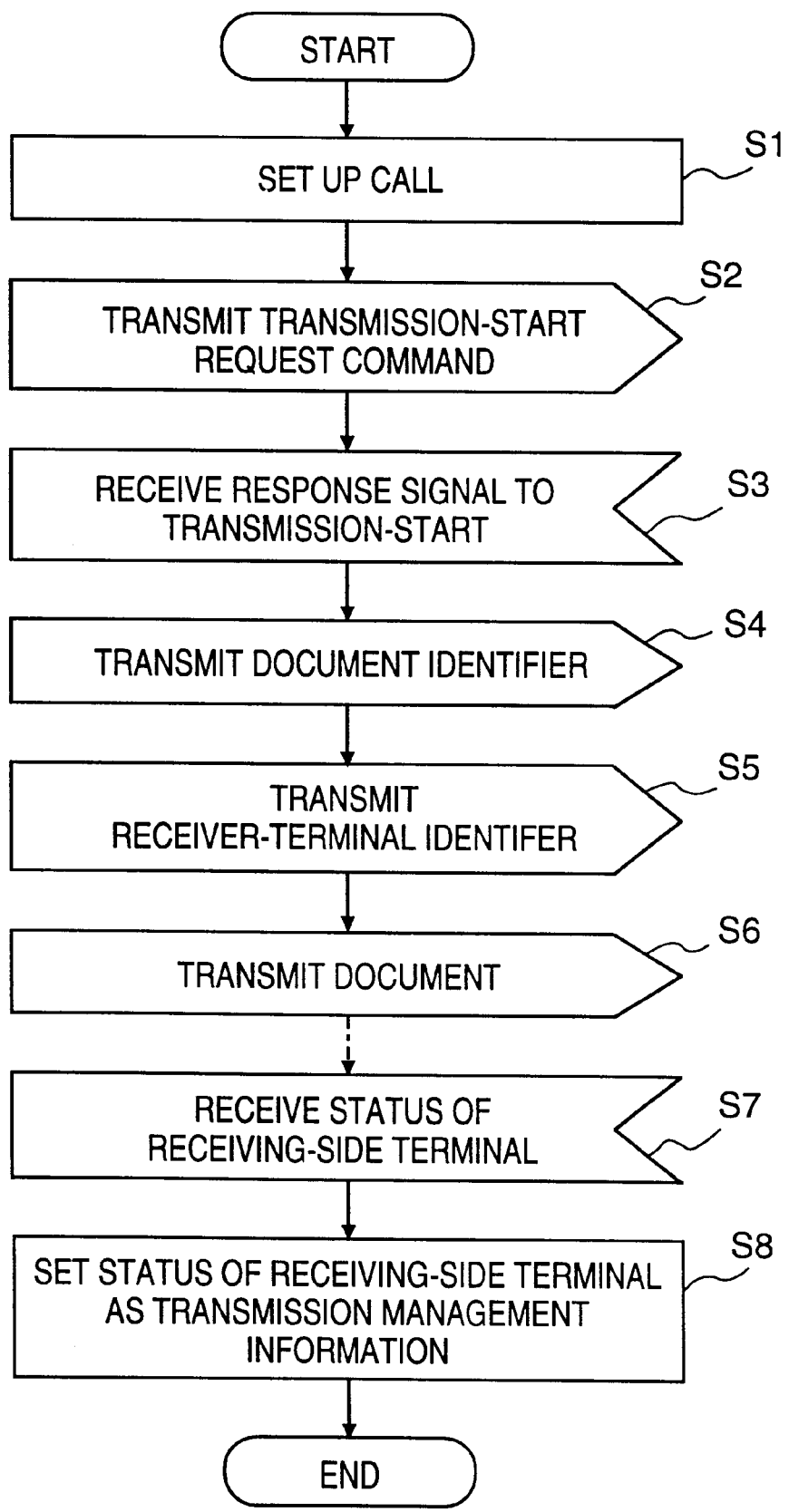
FIG. 4 is a flowchart showing a communication procedure on the transmitting side.

FIG. 4 is a flowchart showing a communication procedure on the transmitting-side facsimile apparatus, according to the present embodiment. At step S1, upon input of a telephone number of the receiving-side facsimile apparatus as a result of reception of transmission instruction, a call using a wireless or wired communication is set up with the receiving-side facsimile apparatus. Note that reception of the transmission instruction will be described later. At step S2, a transmission-start request command is issued. This command includes parameters to designate a receiver terminal and, if a document identifier is transmitted, to check based on the document identifier whether or not the receiving side is capable of returning data indicative of a status of a terminal (designated by the transmitting side) to which a transmission document is transferred. Further, the command includes a telephone number of the transmitting-side facsimile apparatus, and a sender-terminal identifier to identify a terminal, if the transmission requirement is made from the terminal on the LAN of the transmitting side.

At step S3, a response signal is received from the receiving-side facsimile apparatus, and if it is confirmed that the receiving side has an ability to return data indicating the status of the terminal, then information indicating the document identifier of the transmission document is transmitted at step S4.

At step S5, an identifier of the receiver-terminal constituting network identifiers managed on the LAN to which the receiving-side facsimile apparatus is connected, is transmitted as information indicating a receiver-terminal identifier.

At step S6, the transmission document is actually transmitted. If the entire document has been transmitted, a status of the receiving-side terminal, i.e., the document identifier, a connection status (including ON/OFF of the power) of the receiver terminal to the LAN, which corresponds to the receiver-terminal identifier, a log-on status of the receiver terminal, the transfer result of incoming-call notification, the transfer result of the received document etc., is received at step S7. At step S8, the statuses of the receiving side are respectively set in the corresponding fields of the transmission-management information table.

Figure 5:
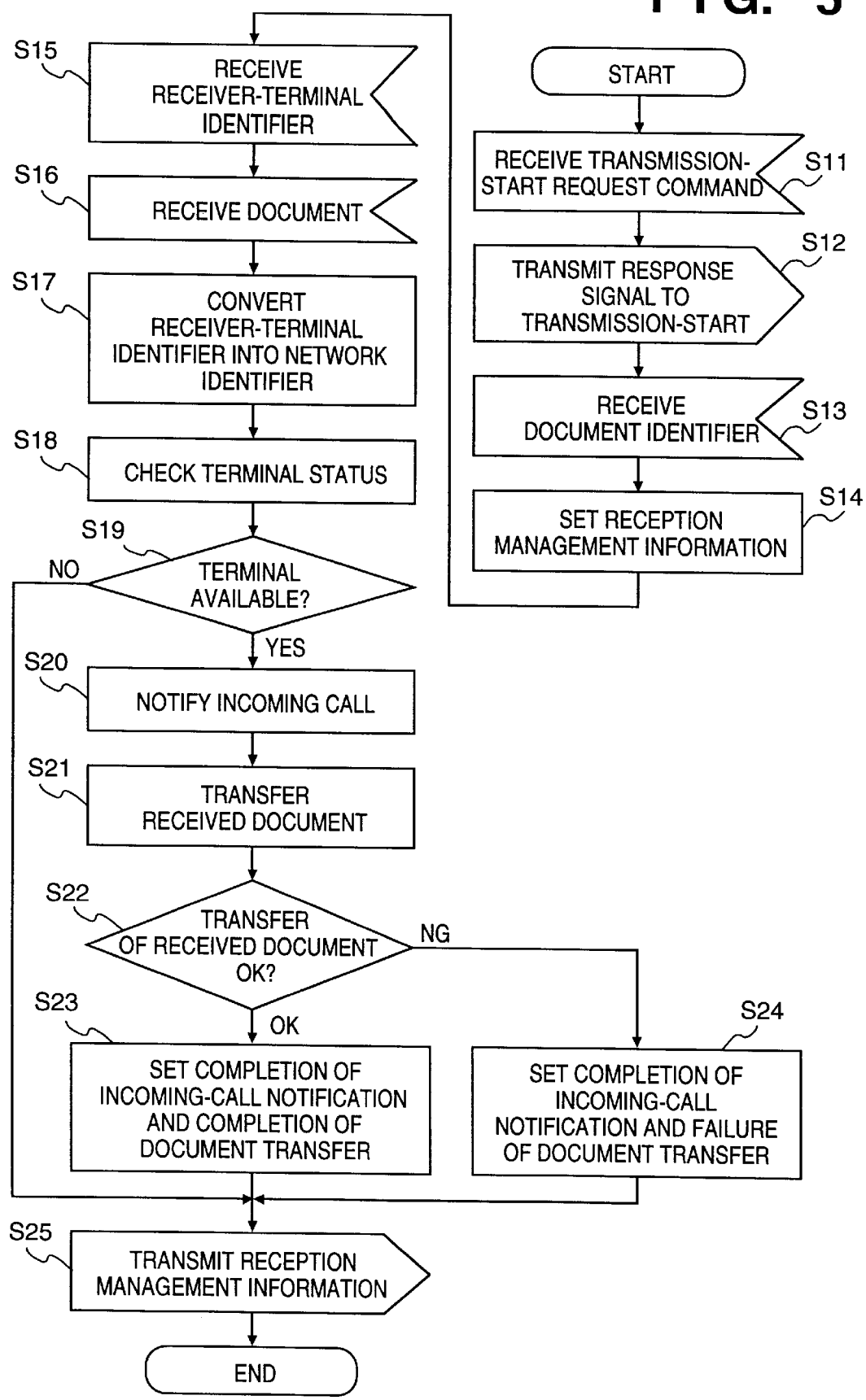
FIG. 5 is a flowchart showing a communication procedure and a transfer procedure on a receiving side.

FIG. 5 is a flowchart showing a communication procedure and a transfer procedure on a receiving side, according to the present embodiment. At step S11, the transmission-start request command is received from the transmitting side. At step S12, a response to the transmission start from the transmitting side is transmitted. At this step, as described above, in a case where the request command includes parameters to designate the receiver terminal away from the transmitting side, and to check based on a received document identifier, whether the receiving side has an ability to return data indicative of a status of a terminal to which the received document is transferred, a parameter indicating that the receiving side has the above ability is added to the response and this response is transmitted.

At step S13, the document identifier is received, and at step S14, the document identifier received at step S13, a telephone number of the transmitting-side facsimile apparatus, and the sender-terminal identification are set as reception management information. At step S15, the receiver-terminal identifier is received, which is set as the reception management information. At step S16, the document data is received and stored into the image memory 104.

When the entire document has been received, the receiver-terminal identifier constituting the reception management information is converted into the network identifier at step S17. This conversion is performed by using a conversion table held in the receiving-side facsimile apparatus, otherwise by making inquiry to a specific terminal (which has a function of converting a receiver-terminal identifier into network identifier) on the network.

At step S18, a terminal corresponding to the network identifier obtained at step S17 is inquired its terminal status. By this inquiry, whether or not the terminal is in an available status can be determined. If the terminal is in an available status, whether or not a receiver having the identifier corresponding to the receiver-terminal identifier is logged on, is also checked.

At step S19, whether or not the terminal is in an available status is determined based on the checking result at step S18. If it is determined that the terminal is in an available status (activated), the process proceeds to step S20. However, if it is determined that the terminal is in an unavailable status, due to some problem, power-off to the terminal, or log-out of the receiver, the process proceeds to step S25.

At step S20, the terminal is notified of an incoming call (notification of reception of document data to the receiver). At step S21, the received document is transferred to the terminal. At step S22, whether or not the transfer of the received document performed at step S21 has been completed is determined.

If it is determined at step S22 that the transfer of the received document has been completed, the process proceeds to step S23, while if it is determined that the transfer failed for some reason such as overflow of an image memory managed by the terminal, the process proceeds to step S24.

At step S23, the completion of the transfer of the received document to the receiver is set as the reception-management information. On the other hand, at step S24, the fact that the notification of incoming-call has been completed but the transfer of the received document has failed is set as the reception-management information. At step S25, the reception-management information including the above document identifier is returned to the transmitting side.

Note that in the above control, return of the status of the terminal on the receiving side is performed in a single communication sequence. However, as the receiving-side terminal holds the telephone number, the sender-terminal identifier and the document identifier of the transmitting-side terminal as reception management information, it may be arranged such that after the processing at step S16, the communication is temporarily terminated, thereafter, a call is re-established based on the telephone number of the transmitting-side terminal and the transmission of the reception-management information is performed at step S25.

FIG. 6 is an example of communication-management information on the transmitting-side facsimile apparatus, according to the present embodiment, which is printed out on a recording sheet in a report format. The information is edited based on information set in the transmission-management information table in FIG. 3, and printed out by the printer 115, in response to a report-output instruction from the operation unit 112, after receiving the reception management information from the receiving-side facsimile apparatus.

As shown in FIG. 6, the communication-management information comprises the document identifier field F1, the transmission-start date & time field F2, the receiving-side telephone number field F3, the receiver-terminal identifier field F4 indicative of a receiver to which a document is transmitted, the document attribute field F5, the communication result field F6, the transfer result field F7 indicative of a transfer result, incoming call notification result and a status of the terminal, and the sender-terminal identifier field F8 indicative of a sender which has sent a transmission instruction.

When the facsimile apparatus 201 receives the transmission instruction (from the operation unit 112, or the client machine on the wired LAN 125 or on the wireless LAN 126), the document identifier F1 is automatically given.

The transmission-start date and time F2, indicative of a time and date is automatically set at which the call is established at step S1 in FIG. 4.

The receiving-side telephone number F3 is a telephone number of the receiving-side facsimile apparatus, which is inputted from the operation unit 112, or a telephone number included in a transmission-instruction command sent from the client machine on the wired LAN 125 or on the wireless LAN 126.

The receiver F4 indicates a receiver terminal corresponding to the receiver-terminal identifier, inputted from the operation unit 112 upon transmission instruction, or included in the transmission-instruction command from the client machine on the wired LAN 125 or on the wireless LAN 126, for designating the receiver terminal on the LAN to which the receiving-side facsimile apparatus is connected.

As the document attribute F5, a document attribute such as data type of the transmission document or the number of pages is set. The data type includes a facsimile-document constiting pixel data, a PDL (e.g. postscript) document written in printer description language, and an ASCII document consisting of ASCII codes. Note that an image read by the scanner 111 is transmitted as a facsimile document.

The communication result F6 indicates the result of communication when normal, it is indicated as OK, when abnormal, as NG, performed between the transmitting-side and receiving-side facsimile apparatuses. In case of NG, an error code is also recorded, and the reason for the error (e.g., the image memory 104 of the receiving-side facsimile apparatus has no available memory space, the line is busy, or the receiving side is not in a facsimile mode) is notified.

The transfer result F7 indicates whether or not notification of the incoming-call and transfer of the received document to the receiver terminal designated by the transmitting side, have been normally performed when the notification or the transfer is normal, it is indicated as OK, when abnormal: as NG). In case of NG, an error code is also recorded, and the reason for the error (e.g., the image data memory of the client machine of the receiver has no available memory space) is notified.

The sender F8 is the sender-terminal identifier inputted from the operation unit 112 upon transmission instruction, or the sender-terminal which corresponds to the network identifier of the client machine on the wired LAN 125 or on the wireless LAN 126, which has sent a transmission instruction. Note that upon transmission instruction from the operation unit 112, a mark such as "*" is recorded if no sender-terminal identifier is inputted.

Figure 7:
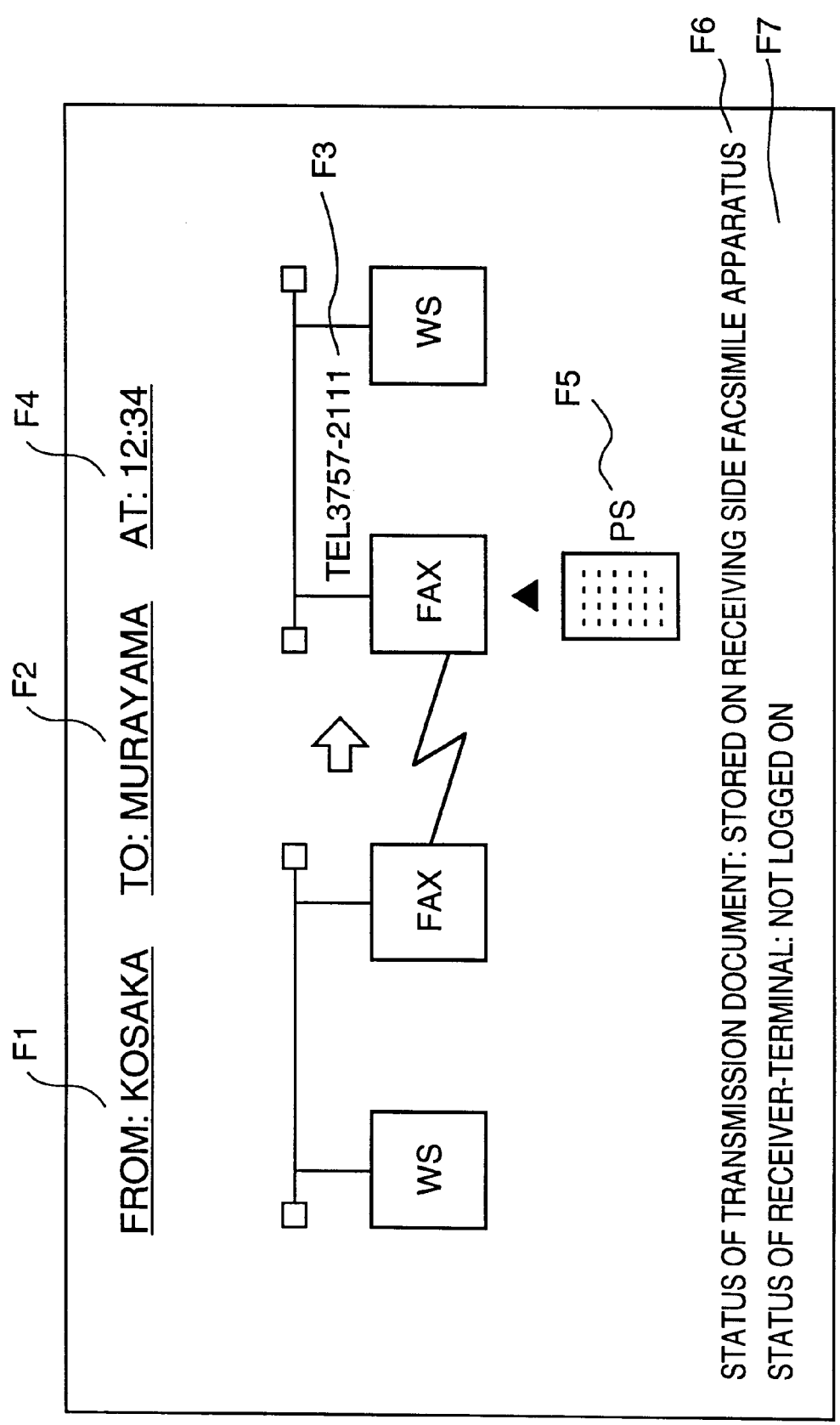
FIG. 7 is an example of a displayed image when a terminal refers to transmission-management information.

FIG. 7 is an example of a displayed image when the terminal on the LAN refers to transmission-management information. More specifically, it shows an example of a displayed image in a case where the terminal, in which a sender corresponding to a sender-terminal identifier logs on to the LAN to which the transmitting-side facsimile apparatus is connected, refers to the transmission-management information.

In FIG. 7, at F8, a sender's name based on a sender-terminal identifier is set; at F2, transmission-start date and time; at F4, a user's name based on a receiver-terminal identifier; and at F3, a telephone number of a receiving-side apparatus. At F5, present location of a transmission document is indicated with a predetermined icon. At F6, a message explaining the icon display at F5 is set, and at F7, a status of the receiver terminal and a terminal to which the document is transferred are set.

The information displayed as F1 to F7 is set similarly to the transmission-management information in FIG. 6. Note that regarding the transmission-management information in FIG. 7, a format common to each information is held in the terminal (the logged-on terminal corresponding to the sender-terminal identifier). In response to a display instruction for transmission-management information (including designation of the document identifier and the like) from the user of the sender terminal, the terminal receives the information F1 to F7 from the facsimile apparatus and displays the information at corresponding positions.

Figure 8:
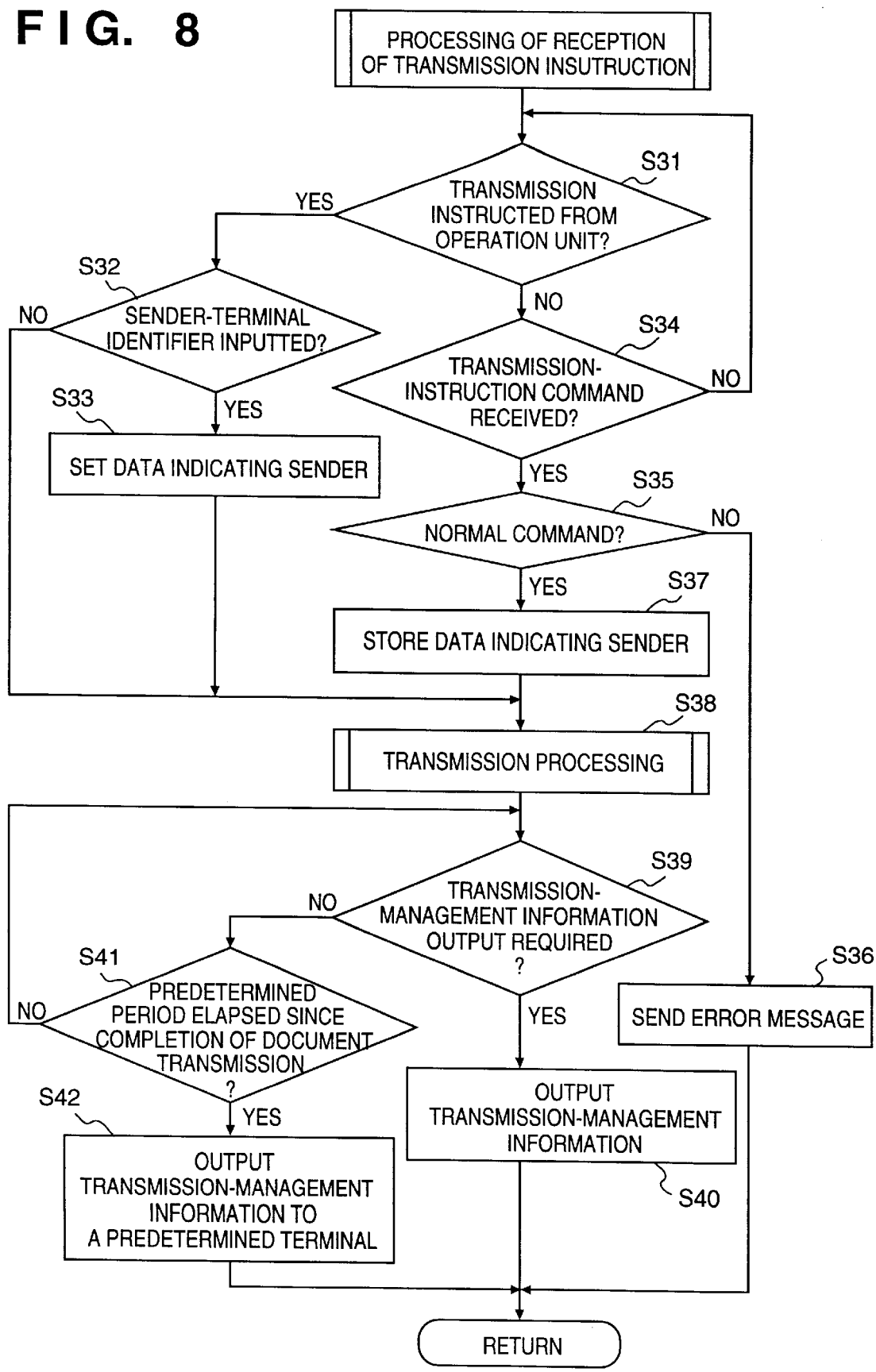
FIG. 8 is a flowchart showing a processing procedure of reception of transmission instruction and output of the transmission-management information.

FIG. 8 is a flowchart showing a reception processing procedure of a transmission instruction (including output processing of the transmission-management information) by the transmitting-side facsimile apparatus, according to the present embodiment. At step S31, whether or not there has been an input to instruct transmission of document data (an image read by the scanner 111 or image data stored in the image memory 104) from the operation unit 112, is determined. If YES, the process proceeds to step S32 at which whether or not an input of a sender-terminal identifier has been made at the operation unit 112 is determined. If YES at step 32, the process proceeds to step S33 at which data indicating a user of the sender terminal is stored in a predetermined area of the RAM 103.

At step S34, whether or not a transmission-instruction command has been sent from a terminal on the wired LAN 125 or on the wireless LAN 126 is determined. If YES at step 34, the process proceeds to step S35 at which the command is normal or not is determined. If YES at step 35, the process proceeds to step S37, while if NO, the process proceeds to step S36, at which an error message is returned to the sender terminal (client machine) which has sent this command. The transmission-instruction command includes a telephone number of a receiving-side facsimile apparatus, a receiver-terminal identifier designating a receiving terminal on the LAN to which the receiving-side facsimile apparatus is connected, document data and the like. At step S37, data indicating a user of the sender terminal which has sent the transmission-instruction command, is stored in a predetermined area of the RAM 103.

At step S38, a document identifier is given, and transmission processing as described by steps S1 to S8 in FIG. 4 is performed, then the process proceeds to step S39. At this time, the sender is notified of the given document identifier. At step S39, whether or not output requirement for transmission-management information has been made from the client machine on the wired LAN 125 or on the wireless LAN 126 is determined. If YES, the process proceeds to step S40, while if NO, the process proceeds to step S41. At step S40, the transmission-management information indicated by F1 to F7 in FIG. 7 is transmitted to the client machine so as to be displayed on the client machine that has made the output requirement. At step S41, whether or not a predetermined period of time has elapsed since the completion of document transmission at step S6, is determined. If YES, the process proceeds to step S42, at which the transmission-management information is outputted to the client machine of the sender whose data is stored in the RAM 103 at step S33 or S37. Note that when the document identifier is given at step S38, the data stored at steps S33 and S37 is stored in correspondence with the document identifier. If the data with respect to the sender terminal is not stored in the RAM 103 (e.g., transmission instruction has been made from the operation unit 112 and no sender-terminal identifier has been inputted), the transmission-management information is sent to a predetermined client machine.

As described above, according to the present embodiment, the same document identifier is used on both transmitting and receiving sides, in order to manage facsimile transmission information, such as a status of the receiving-side facsimile apparatus, a status of the receiver terminal i.e, whether or not the power is supplied to a computer terminal to be designated as the receiver terminal (the client machine of the sender who is to receive facsimile transmission document), a status as to whether or not the terminal is appropriately connected to the network, further, information used when the receiving side transfers the received facsimile document, i.e., whether or not the receiver terminal to which the facsimile-transmission document is transferred is logged on, whether or not notification of facsimile reception has been normally made, and whether or not the facsimile-transmission document has been properly transferred to the receiver terminal. Further, the receiving side notifies the transmitting side of information that only the receiving side could get to know, with the document identifier. According to this structure, exact communication management information can be held on both transmitting and receiving sides.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

Note that the flowcharts shown in FIGS. 4, 5 and 8, and the operation to output the transmission-management information as shown in FIGS. 6 and 7 are performed by the CPU 101 based on the control programs stored in the ROM 102. The present invention can be applied to other devices, by storing information indicated by the control programs into a removable storage medium such as a magneto-optical disk, and applying this information to those devices which can read the information.

As described above, according to the present invention, transmission-management information about data to be transmitted to a receiving side can be exactly managed, based on an identifier assigned to the data.

Further, the result of transmission can be returned to a sender-terminal on a LAN.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus for transmitting data to a remote communication apparatus connected to a LAN (Local Area Network), the remote communication apparatus receiving and transferring the transmitted data to another destination on the LAN, comprising:

designation means for designating a destination on the LAN;

setting means for setting an identifier to specify the data;

transmission means for transmitting the data, information indicative of the destination designated by said designation means, and information indicative of the identifier set by said setting means to the remote communication apparatus; and management means for managing information, in at least three stages, indicating whether or not the data transmitted by said transmission means has actually been transferred from the remote communication apparatus to the destination on the LAN designated by said designation means, in correspondence with the identifier set by said setting means, wherein, in a case in which transmission of the data to the destination has failed, said management means manages information indicating a reason for failure of the transmission.

2. The data communication apparatus according to claim 1, wherein the information managed by said management means is information transmitted from the remote communication apparatus, based on the information indicative of the identifier transmitted by said transmission means.

3. The data communication apparatus according to claim 1, further comprising output means for outputting the information managed by said management means.

4. The data communication apparatus according to claim 3, wherein said output means outputs information associated with plural sequences of transmission performed by said transmission means.

5. The data communication apparatus according to claim 1, wherein the destination designated by said designation means is a location to which the data is addressed on the LAN.

6. A data communication apparatus according to claim 1, wherein the at least three stages include a first stage in which the transmitted data does not reach the remote communication apparatus, a second stage in which the transmitted data reaches the remote communication apparatus but does not reach the destination, and a third stage in which the transmitted data reaches the destination.

7. A data communication apparatus connected to a LAN (Local Area Network), comprising:

reception means for receiving a transmission instruction for transmitting data from a user of the LAN;

transmission means for transmitting the data based on the transmission instruction received by said reception means; and notification means for notifying the user, that made the transmission instruction, of a status of transmission of a transmission performed by said transmission means, wherein the status of transmission indicates a location that the data has actually reached, wherein the location is changed in at least three stages, and in a case in which the data has not reached a destination in a last stage of the at least three stages due to a failure, said notification means notifies the user of a reason for the failure as the status of transmission.

8. The data communication apparatus according to claim 7, wherein the transmission instruction includes information designating a user which is to receive the data on a LAN on a receiving side.

9. The data communication apparatus according to claim 8, wherein said notification means notifies of information about whether or not the data has been transferred to a terminal of the user on the LAN on the receiving side.

10. The data communication apparatus according to claim 8, wherein said notification means notifies of a status of the user on the LAN on the receiving side.

11. The data communication apparatus according to claim 10, wherein the status of the user on the LAN on the receiving side includes information about whether or not the user is logged on to the LAN on the receiving side.

12. A data communication apparatus according to claims 7, wherein the at least three stages include a first stage in which the transmitted data does not reach said reception means, a second stage in which the transmitted data reaches said reception means but is not transmitted by said transmission means, and a third stage in which the transmitted data is transmitted by said transmission means.

13. A data communication method for transmitting data to a remote communication apparatus connected to a LAN (Local Area Network), the remote communication apparatus receiving and transferring the transmitted data to another destination on the LAN, comprising the steps of:

(a) designating a destination on the LAN;

(b) setting an identifier to specify the data;

(c) transmitting the data, information indicative of the destination designated at said step (a), and information indicative of the identifier set at said step (b) to the remote communication apparatus; and (d) managing information, in at least three stages, indicating whether or not the data transmitted at said step (c) has actually been transferred from the remote communication apparatus to the destination on the LAN designated at said step (a), in correspondence with the identifier set at said step (b), wherein, in a case in which transmission of the data to the destination has failed, said step (d) manages information indicating a reason for failure of the transmission.

14. The data communication method according to claim 13, wherein the information managed at said step (d) is information transmitted from the remote communication apparatus, based on the information indicative of the identifier transmitted at said step (c).

15. A data communication method comprising the steps of:
- (e) receiving a transmission instruction to transmit data from a user on a LAN (Local Area Network);
- (f) transmitting the data based on the transmission instruction received at said step (e); and
- (g) notifying the user of a status of transmission of a transmission performed at said step (f), wherein the status of transmission indicates a location that the data has actually reached, wherein the location is changed in at least three stages, and in a case in which the data has not reached a destination in a last stare of the at least three stages due to a failure, said step (g) notifies the user of a reason for the failure as the status of transmission.

16. The data communication method according to claim 15, wherein the transmission instruction includes information designating a user which is to receive the data on a LAN on a receiving side.

17. The data communication method according to claim 16, wherein at said step (g), notification is performed of information about whether or not the data has been transferred to a terminal of the user on the LAN on the receiving side.

18. The data communication method according to claim 16, wherein at said step (g), notification is performed of a status of the user on the LAN on the receiving side.

19. The data communication method according to claim 18, wherein the status of the user on the LAN on the receiving side includes information about whether or not the user on the LAN on the receiving side is logged on to the LAN on the receiving side.

20. A data communication apparatus for transmitting data to a remote communication apparatus connected to a LAN (Local Area Network), comprising:

transmission means for transmitting the data to the remote communication apparatus;

management means for managing information indicating a status of a transmission performed by said transmission means; and display means for displaying graphically, by using a symbol representing stages in a sequence of transmission of the data, the status of the transmission of the data based on the information managed by said management means.

21. The data communication apparatus according to claim 20, further comprising designation means for designating a destination on the LAN, wherein said transmission means further transmits information indicative of the destination.

22. The data communication apparatus according to claim 20, wherein the information managed by said managing means indicates whether or not the data transmitted by said transmission means has reached the remote communication apparatus, and whether or not the data then has been transferred from the remote communication apparatus to a receiver.

23. The data communication apparatus according to claim 20, wherein said transmission means transmits the data to a remote facsimile apparatus.

24. A data communication apparatus according to claim 20, wherein said display means graphically displays the status of transmission of the data by changing an object representing the data transmitted by said transmission means in the symbol representing stages in the sequence of transmission of the data.

25. A data communication method comprising the steps of:

transmitting the data to a remote communication apparatus;

managing information indicating a status of the transmission performed at said transmitting step; and graphically displaying, by using a symbol representing stages in a sequence of transmission of the data, the status of the transmission of the data based on the information managed at said managing step.

26. A computer readable storage medium storing a program for controlling a data communication apparatus to transmit data to a remote communication apparatus connected to a LAN (Local Area Network), the remote communication apparatus receiving and transferring the transmitted data to a destination on the LAN, said program comprising:

code for designating a destination on the LAN;

code for setting an identifier to specify the data;

code for transmitting the data, information indicative of the destination designated on the LAN, and information indicative of the set identifier, to the remote communication apparatus; and code for managing information, in at least three stages, indicating whether or not the transmitted data has actually been transferred from the remote communication apparatus to the destination designated in said designating step on the LAN, in correspondence with the set identifier, wherein, in a case in which transmission of the data to the destination has failed, said code for managing manages information indicating a reason for failure of the transmission.

27. A computer readable storage medium storing a program for controlling a data communication apparatus, said program comprising:

code for receiving a transmission instruction to transmit data from a user of a LAN (Local Area Network);

code for causing transmission of the data based on the transmission instruction received from the user of the LAN; and code for notifying the user that made the transmission instruction of a status of transmission of the transmission of the data caused by said code for causing transmission, wherein the status of transmission indicates a location that the data has actually reached, the location is changed in at least three stages, and in a case in which the data has not reached a destination in a last stage of the at least three stages due to a failure, said code for notifying notifies the user of a reason for the failure as the status of transmission.

\* \* \* \* \*

UNITED STATES PATENT AND TRADEMARK OFFICE
CERTIFICATE OF CORRECTION

PATENT NO. : 6,119,142

DATED : September 12, 2000

INVENTOR(S) : MASAHIKO KOSAKA       Page 1 of 2

It is certified that error appears in the above-identified patent and that said Letters Patent is hereby corrected as shown below:

In the drawings
SHEET 8

Figure 8, "INSUTRUCTION" should read --INSTRUCTION--.

COLUMN 2

Line 64, "transmit" should read --transmits--.

COLUMN 3

Line 20, "printouts" should read --prints out--.
    Line 45, "printouts" should read --prints out--.

COLUMN 6

Line 66, "constiting" should read --consisting of--.

COLUMN 10

Line 46, "claims" should read --claim--.

UNITED STATES PATENT AND TRADEMARK OFFICE
CERTIFICATE OF CORRECTION

PATENT NO. : 6,119,142

DATED : September 12, 2000

INVENTOR(S) : MASAHIKO KOSAKA

It is certified that error appears in the above-identified patent and that said Letters Patent is hereby corrected as shown below:

COLUMN 11

Line 23, "stare" should read --stage--.

Signed and Sealed this

First Day of May, 2001

Attest:

NICHOLAS P. GODICI

*Attesting Officer*    *Acting Director of the United States Patent and Trademark Office*